(12) United States Patent
Lin

(10) Patent No.: US 6,393,292 B1
(45) Date of Patent: May 21, 2002

(54) METHOD OF TRANSMITTING POSITIONS DATA VIA CELLULAR COMMUNICATION SYSTEM

(76) Inventor: Ching-Fang Lin, 9131 Mason Ave., Chatsworth, CA (US) 91311

( * ) Notice: Subject to any disclaimer, the term of this patent is extended or adjusted under 35 U.S.C. 154(b) by 0 days.

(21) Appl. No.: 09/291,503

(22) Filed: Apr. 13, 1999

(51) Int. Cl.[7] .................................................. H04Q 7/20
(52) U.S. Cl. ........................ 455/456; 455/457; 455/435
(58) Field of Search .............................. 455/435, 456, 455/457; 701/213, 207, 214, 201; 342/357.16, 450, 457, 357.01, 357.06

(56) References Cited

U.S. PATENT DOCUMENTS

| | | | | |
|---|---|---|---|---|
| 5,432,841 A | * | 7/1995 | Rimer | 379/59 |
| 5,790,073 A | * | 8/1998 | Tayloe et al. | 342/357 |
| 6,058,308 A | * | 5/2000 | Kallin et al. | 455/432 |
| 6,138,018 A | * | 10/2000 | Pashtan et al. | 455/435 |
| 6,181,940 B1 | * | 1/2001 | Rune | 455/435 |

* cited by examiner

*Primary Examiner*—Thanh Cong Le
*Assistant Examiner*—Lana Le
(74) *Attorney, Agent, or Firm*—Raymond Y. Chan; David and Raymond Patent Group (57) ABSTRACT

A method of transmitting position data via cellular communication system includes the steps of receiving position data from a position producer, attaching the position data to a location registration data stream, and sending the position data along with the location registration data to a base station. This method takes advantages of the existing location updating procedure in a cellular network system to transmit precision position data of a mobile station. It does not need a dialing up to transmit position data. By utilizing this method, the position data of the mobile station can be delivered to the base station or cellular network whenever the mobile station is powered on.

14 Claims, 8 Drawing Sheets

METHOD OF TRANSMITTING POSITIONS DATA VIA CELLULAR COMMUNICATION SYSTEM

FIELD OF THE PRESENT INVENTION

The present invention relates generally to a wireless data transmission method, and more particularly to a wireless location information transmission via cellular communication system such as cellular phone. A position producer generates position data and passes to a cellular phone. This cellular phone sends the position data to base station during each location updating procedure.

BACKGROUND OF THE PRESENT INVENTION

The service area in a cellular communication system is arranged into appropriate network of contiguous radio cells. Each cell has a base station that utilizes an associated set of radio channels to effectively connect to any mobile station located in the cell. The systems uses two types of duplex channels. Control channels are used to transfer system-control data to and from mobiles, and voice channels provide a link for speech or data transmissions and in-call supervisory tones. The base stations are connected, via the conventional landline system or microwave links, to a mobile switching center (MSC). It is the MSC that controls the connection of the mobiles to each other and to the national and international telephone system.

Because mobile users are always on the move, the mechanisms that the networks use to locate each of us within wireless communication networks are important. This is referred to as roaming and call routing. With roaming agreements in place it does not matter where we are. We are connected and people can find us. We get service and we can make calls. Current mobile communication networks and personal communication systems support roaming and call routing described as above. The global system for mobile communications (GSM) is one of the examples. Another example is the personal communication systems (PCS) 1900. These systems even have country roaming capability. When we travel to another country which has roaming agreement, we still can get mobile communication services.

The most important tool used for finding phones within mobile wireless communication networks is location updating. The location of a mobile station is uniquely identified by the mobile country code (MCC), the mobile network code (MNC), and the location area identity (LAI). The MCC is a three-digit value that identifies the country where the network located. The MNC is a two-digit value that identifies different networks within one country. The LAI identifies the physical area in which a mobile station is located. A location area may consist of one or more physical cells; it is also referred as a paging area, in which a network designates as a mobile station's location for paging tasks.

Figure 2:
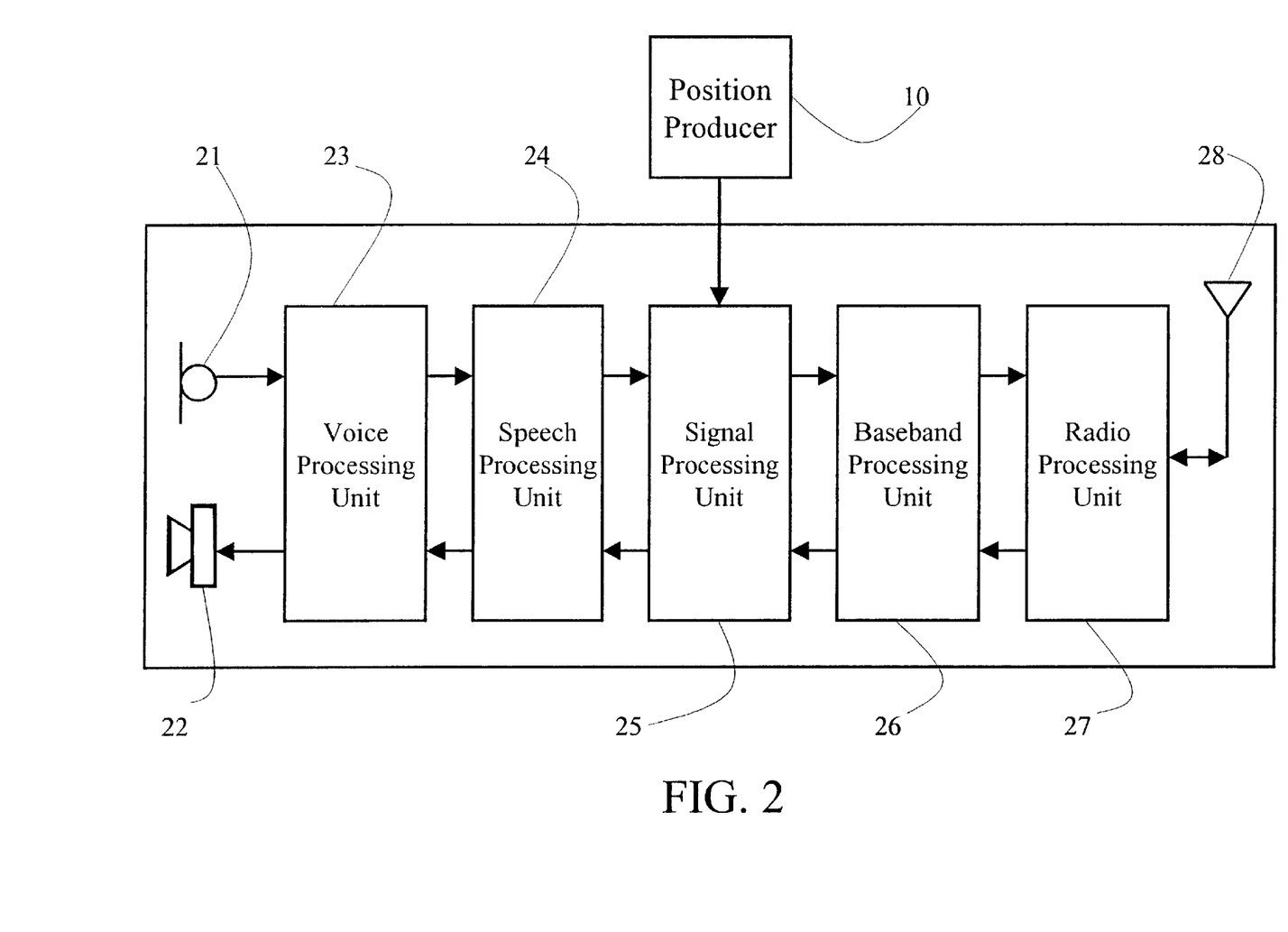
FIG. 2 is a block diagram illustrating the processing steps of a cellular handset with a position producer.

With each location updating procedure, the mobile station, such as a cellular phone as partially shown in FIG. 2, reads its location from the control channel transmitted by its serving base transceiver station (BTS) 31 and reports it back to the network. In a wireless communication network, two registers store the location-related data of a mobile station: the home location register (HLR) 34 and the visitor location register (VLR) 35. The HLR 34 keeps data that are permanently associated with individual mobile stations as well as the current location. The permanent data include subscription details such as the teleservices, bearer services, and supplementary services allocated to the subscriber. The VLR 35 keeps temporary data on a subscriber for only as long as the subscriber is located in the area belonging to a particular VLR. The temporary data contains the subscription-related data (obtained from the subscriber's HLR) as well as the mobile station's exact location in the VLR's area. The position data of a mobile station is given by the base station controller 32. The resolution of the location area is the same as the base station controllers (BSCs).

For example, within a base station controller 32 having a coverage area of 100 square miles, you may determine whether the mobile station is in this area according to the position data provided by the base station controller 32. However, there is no way to obtain any exact location information from this locate updating procedure.

On the other hand, although a GPS (Global Positioning System) receiver obtains positioning information from satellites, which is processed to provide position data by a position producer. However, only the user of GPS receiver and position producer can access such position data. Therefore, most of the positioning systems, including the GPS systems and the IMU systems, are merely applied in vehicles such as airplanes and ships. Some mini GPS systems can also be carried by individuals such as mountain climbers and explorers so as to help them to find out their own exact locations.

However, if a particular person's position or location must be tracked by others for safety or security reason, very accurate and expensive equipment must be employed to send and receive the position data from the particular person. Therefore, only specific people such as the military officers or government agents can afford such technology for special mission. The convenience of positioning information still can not be publicly applied and be utilized in our daily lives.

SUMMARY OF THE PRESENT INVENTION

It is a main objective of the present invention to provide a method of transmitting position data via cellular communication system, wherein one can obtain the exact location of any particular cellular phone user through the cellulose phone system.

It is another objective of the present invention to provide a method of transmitting position data via cellular communication system, so that the cellular phone users can obtain their positions from their cellular phones easily.

It is another objective of the present invention to provide a method of transmitting position data via cellular communication system, wherein one can obtain another cellular phone user's location from the base station of the cellular phone.

It is another objective of the present invention to provide a method of transmitting position data via cellular communication system, wherein one can obtain another cellular phone user's location by making phone call to that cellular phone.

It is another objective of the present invention to provide a method of transmitting position data via cellular communication system, wherein non-dialing is required to send out the position data. In fact, the position data of the mobile station (cellular handset) is available and continuously transmitted to the base station via a cellular handset when the handset is powered on.

It is another objective of the present invention to provide a method of transmitting position data via cellular communication system, wherein once the cellular phone of the user is powered on, the cellular phone's position, i.e. the cellular phone user's location, is available by sending position data to the base station along with each location updating procedure of that cellular phone. Moreover, the cellular phone users may willfully choose to provide or block their position data.

It is another objective of the present invention to provide a method of transmitting position data via cellular communication system, wherein a position data producer is equipped in a mobile station such as a cellular phone for producing position data which is send to the base station of the cellular communication system during mobile station location updating procedures.

It is another objective of the present invention to provide a method of transmitting position data via cellular communication system, wherein the position data generated by Global Positioning System (GPS) receiver can be transmitted via a mobile station such as a cellular phone during mobile station location updating procedures.

In order to accomplish the above objectives, the present invention provides a method of transmitting position data via cellular communication system, which comprises the steps of:

generating a position data by a position producer;

sending the position data to a mobile station from the position producer;

attaching the position data to a location registration data stream which is sent by the mobile station to a base station to inform which area does the mobile station currently reside in;

sending the position data along with the location registration data stream to the base station from the mobile station; and retrieving the position data by the base station.

DETAILED DESCRIPTION OF THE PRESENT EMBODIMENT

Referring to FIGS. 1 to 8, the present invention contrives an effective approach to continuously transmit the mobile station user's position via a cellular handset when the handset is powered on. The main concept of the present invention is to transmit the position data generated by a position producer by attaching the position data to the registration data stream of a mobile station, which seamlessly performs location updating procedure when power is on. During the location updating procedure the registration data including the mobile station identification number, the mobile country code (MCC), the mobile network code (MNC), and the location area identity (LAI) are transmitted to the network. Whether the speech occurs or not, this location updating procedure is performed periodically through a control channel of the cellular network. By means of the present invention, the base station 30 of the network knows the precision position of any mobile station at any time.

Figure 1:
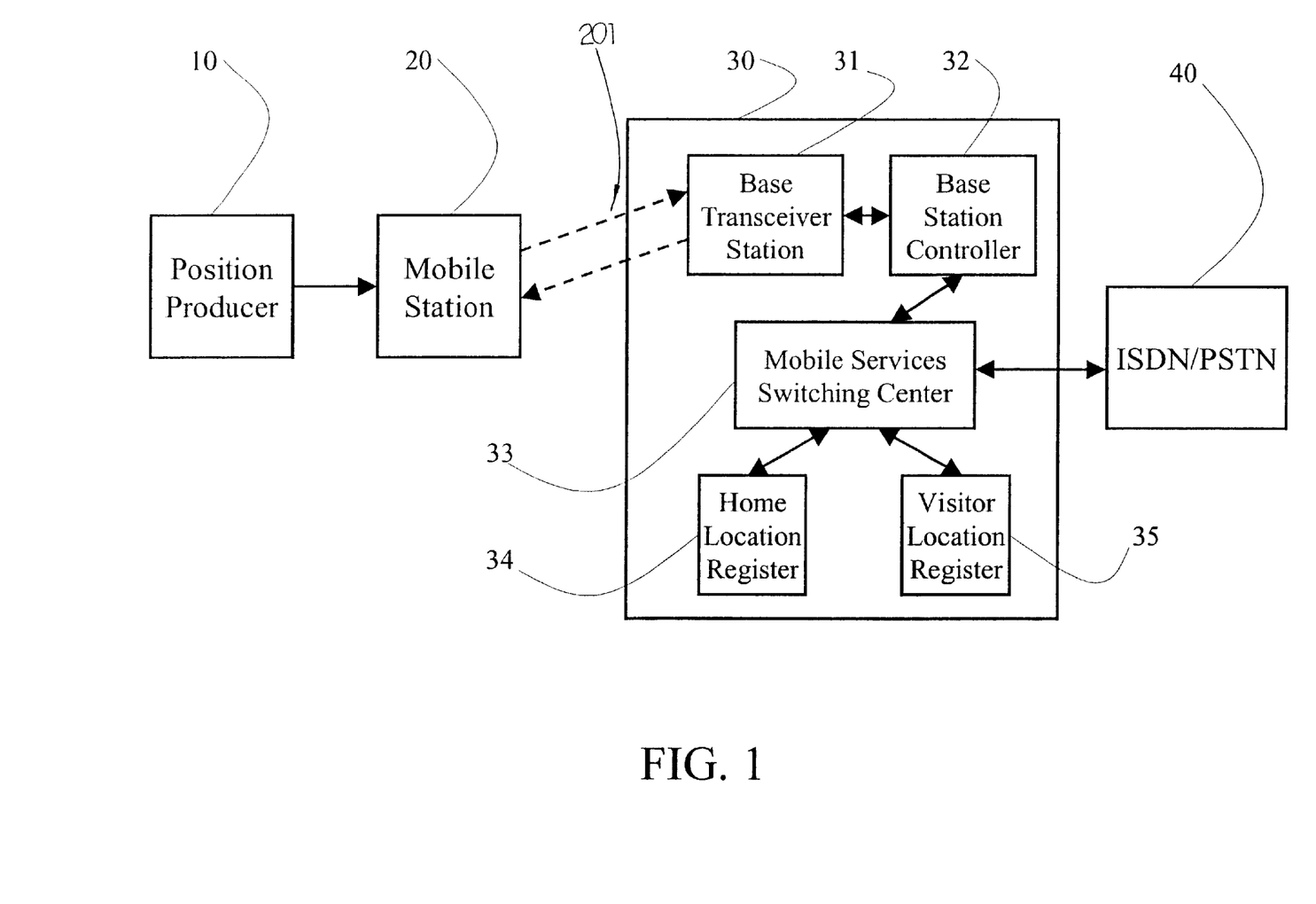
FIG. 1 is a block diagram illustrating the transmission of position data generated by a position producer via cellular networks.

To process the position data transmission via cellular network method of the present invention, as shown in FIG. 1, a position producer 10 is connected to a mobile station 20 which is connected to a base station 30 of a cellular network via a wireless channel. This mobile station can be a cellular phone handset which is used to transmit user's precision position generated by the position producer to base station 30 periodically. The base station 30 is connected to an ISDN (Integrated Services Digital Network) or a PSTN (Public-Switched Telephone Network). By this way, the existing ISDN or PSTN can be used to send the user's precision position data to a remotely monitoring center.

The method of transmitting position data via cellular communication system according to the present invention comprises the steps as follows:

(1) Send user's position data to a mobile station 20 from a position producer 10. The user's position can be in geodetic frame or in ECEF (Earth-Centered-Earth-Fixed) coordinate system. In geodetic frame, the user's position is given in Latitude and Longitude. In ECEF coordinate system, the user's position is given by three dimensional coordinates (x,y,z).

(2) Receive a mobile station country code, a mobile network code, and a location area identity from a base station 30, wherein a combination of the mobile station country code, the mobile network code, and the location area identity gives the service area in which the mobile station 20 currently resides.

(3) Attach user's position data to the location registration data stream 201 by the mobile station 20. During existing location updating procedure in a cellular network system, the location registration data stream 201 is sent by the mobile station 20 to the base station 30 to inform which area does the mobile station 20 currently reside in. The location registration data generally include the identification (ID) number of the mobile station 20, the mobile country code, the mobile network code, and the location area identity.

(4) Periodically send the user's position data along with the location registration data by the mobile station 20 to the base station 30. This is a periodical procedure which is called periodic location updating in current cellular networks. This step is performed after a period of time predefined by the network and constantly sent to all active mobile stations 20 monitoring the control channel. This step can also take place whenever the mobile station 20 is powered on. It can also take place when the mobile station 20 detects a location area change.

(5) Retrieve the user's position data by the base station 30 and store it. The retrieved user's position can be stored in the home location register 34 or visitor location register 35. It can also be stored in an independent register.

(6) Send the user's position data by the base station 30 to the remotely monitoring center via ISDN/PSTN. This is an optional step of the present invention. The position information of mobile station can be stored at this remotely monitoring center.

It is worth to mention that the above step (3) can be disabled. This is realized by setting a functional key on a mobile station 20.

User's position data can be attached to the head of the location registration data. It can also be attached to an end of the location registration data, for example, after the mobile country code and therefore the mobile network code, or after the mobile network code and before the location area identification.

As shown in FIG. 2, a typical mobile station 20 is illustrated, which generally comprises a microphone 21, a speaker 22, a voice processing unit 23 connected with the microphone 21 and the speaker 22, wherein the voice processing unit 23 includes two converters: analog-to-digital converter (ADC) for the analog input signal from microphone and digital-to-analog converter (DAC) for the converted analog output signal to speaker. The voice processing unit 23 can contain band-limiting low-pass filters for anti-aliasing in the transmit path, and waveform reconstruction in the receive path. There are also some gain amplifiers for the signals coming from the microphone and signals that drive the speaker.

The mobile station 20 further comprises a speech processing unit 24 which is connected between the voice processing unit 23 and a signal processing unit 25. The signal processing unit 25 is connected with the position producer 10 and a baseband processing unit 26. The speech processing unit 24 generally contains speech encoder and decoder to encoding the digital voice data from the voice processing unit 23 and to recreate the speech sounds that specified the bits the coder generated. The signal processing unit 25 works with the user data including speech and data traffic, as well as signaling and control information. The mobile station 20 also comprises a radio processing unit 27 which is connected between the baseband processing unit 26 and a transceive antenna 28. The transceive antenna is responsible to transmit and receive signal to or from the base station 30 of cellular networks.

Referring to FIG. 2, the above step (3) comprises the further steps as follows:

(a) Encode the user's position data during signal processing. A common ciphering scheme can be applied to the coded user's position data.

(b) Modulate the coded data including the user's position data during signal processing. The modulation scheme can be GMSK (Gaussian-filtered Minimum Shift Keying) modulation.

(c) Convert the coded data which is registry data stream 201 as well as user's position data into analog signal. The baseband processing unit 26 contains two digital-to-analog converters (DACs) which deliver analog baseband in-phase (I) and quadraphase (Q) signals to modulate the radio user.

(d) Amplify the analog transmit signal by the radio processing unit 27.

(e) Broadcast the signal from the transceive antenna 28 of the mobile station 20 such as a cellular phone handset to a base station terminal of the base station 30.

There are three different types of location updating procedures in current cellular networks. Because the present invention utilizes the location updating procedure to transmit the user's precision position generated by the position producer 10, the position transmission via cellular network also has three ways as follows:

(1) The position data transmission takes place whenever a mobile station 20 is powered on. After an internal initialization, the mobile station 20 checks for an available network. When it finds one, the mobile station 20 is able to read the location information that includes the mobile country code (MCC), the mobile network code (MNC), and the location area identity (LAI). The mobile station 20 initiates a location update procedure. During this location update procedure, the position data generated by the position producer 10 is transmitted along with the MCC, the MNC, and the LAI.

(2) The position data transmission is performed after a period of time predefined by the network. In this mode, the position data generated by the position producer 10 is transmitted periodically to the base station 30 along with the MCC, the MNC, and the LAI.

(3) The position data transmission takes place when the mobile station 20 detects a location area change. In current cellular networks, when the mobile station 20 detects a location area change, it will notify the network that it is now located in a different area by sending back the MCC, the MNC, and the LAI to the base station 30, and the mobile station's ID as well. During this notification of the location area change, the position data generated by the position producer 10 is transmitted to the base station 30 along with the MCC, the MNC, and the LAI.

The position producer 10 of the present invention can be a GPS (Global Positioning System) user equipment, comprising a GPS antenna, a signal processing unit, and associated electronics. The GPS user equipment receives signals from the global positioning system satellites to derive position, velocity, and time solution. The global positioning system principle of operation is based on range triangulation. Because the satellite position is known accurately via ephemeris data, the user can track the satellite's transmitted signal and determine the signal propagation time. Since the signal travels at the speed of light, the user can calculate the geometrical range to the satellite. According to these range measurements, the user's position can be calculated.

The position producer 10 of the present invention can be an inertial navigation system (INS) which comprises an onboard inertial measurement unit (IMU), a processor, and embedded navigation software(s). The positioning solution is obtained by numerically solving Newton's equations of motion using measurements of vehicle specific forces and rotation rates obtained from onboard inertial sensors. The onboard inertial sensors, including accelerometers and gyros, together with the associated hardware and electronics comprise the inertial measurement unit (IMU).

The position producer 10 of the present invention can also be a GPS/INS integrated system in which GPS user equipment and the INS aid each other to obtain a robust and high precision positioning solution.

For some applications where equipment size is not a critical factor, for example on a motion vehicle, the position producer 10 of the present invention can be an external device which resides outside the mobile station 20. In other applications miniaturization is required for portability, for example for person use, the position producer 10 of the present invention is preferred to be a built-in device installed inside the mobile station 20.

For some applications where voice communication is not required, the mobile station 20 of the present invention merely comprises the position producer 10, the signal processing unit 25, the baseband processing unit 26, the radio processing unit 27, and the transceive antenna 28. The position producer 10 is connected to the signal processing unit 25. The baseband processing unit 26 is connected between the signal processing unit 25 and the radio processing unit 27. The transceive antenna 28 is connected to the radio processing unit 27 to receive control information from the base station 30 of cellular networks and to transmit registration data as well as user's position data to base station 30 of the cellular networks.

In some applications, the user of the mobile station 20 needs to know the position information about himself or herself An enhanced mobile station 20 according to the present invention can further includes a display to show the user's position in text format. This display is attached to the position producer 10 or to the signal processing unit 25 of the mobile station 20.

In some applications, a sophisticated navigation function is required by the mobile station user. Such enhanced mobile station according to the present invention should include a map database and a graphic display as well. The display can show the user's position graphically as well as the map. The combination of the map display and the user's position tells the user's current location and surrounding features such as buildings, roads and mountains. Also this map can give the user navigation information and guidance functionality.

Most of the cellular handsets already has a small screen to display telephone number or a short message. The mobile station 20 can be an enhanced cellular handset according to the present invention, which provides a functional key to access the position displaying function. Once the user presses this key, the cellular handset reads position data from the position producer 10 and displays it on the small screen.

In plenty of situations, another user of another mobile station or somebody would want to know the precision position of a specific person who is the user of the mobile station 20. For example, the security control center would like to monitor all the exact positions of all the security guards on duty outside. The mobile station 20 according to the present invention can be enhanced to provide a specious function to get the location information of a specific mobile station. The mobile station user dials the phone number of this specific mobile station and actives this specious function. After building of the connection between the mobile station 20 and the network the caller can access the position data of this specific mobile station 20 at the base station 30 or the remotely monitoring center. This function can easily be extended to regular static phone users. A regular static phone user can dial the number of a specific mobile station 20 and active the location querying function. Then, the regular static phone user can access the position data of this specific mobile station 20 at the base station 30 or the remotely monitoring center through the PSTN.

Figure 3:
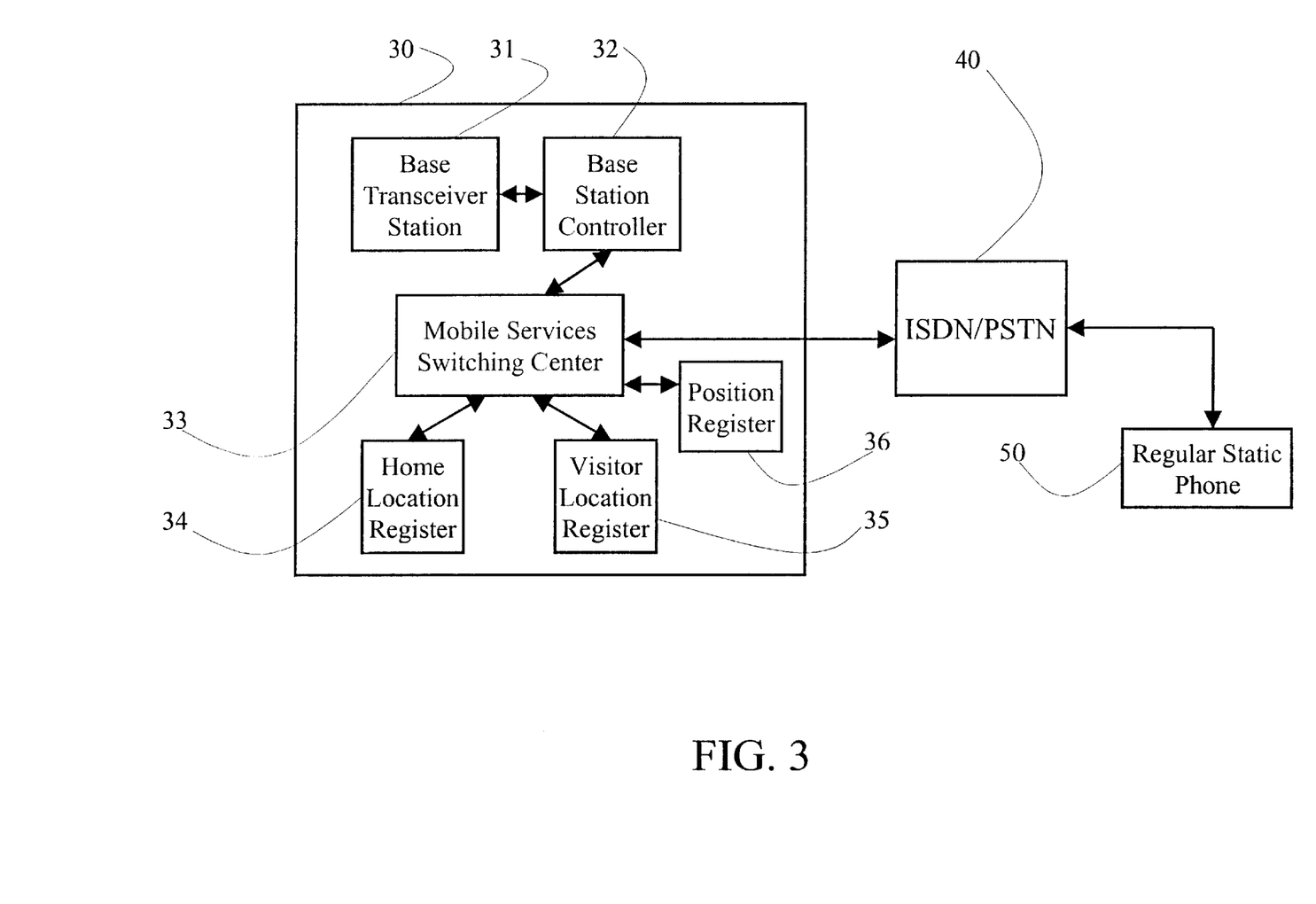
FIG. 3 is a block diagram illustrating the procedure of mobile station position access using a regular static phone.

FIG. 3 illustrates a regular static phone 50 user accessing the position of the mobile station 20. The mobile services switching center 33 of the base station 30 is connected to the ISDN/PSTN 40 which is connected to the regular static phone 50. A position register 36 of the base station 30 is connected to the mobile services switching center 33, which is used for storing position data of mobile stations. Through the ISDN/PSTN 40 and the mobile services switching center 33, the regular static phone 50 can access the position data at the position register 36.

Figure 4:
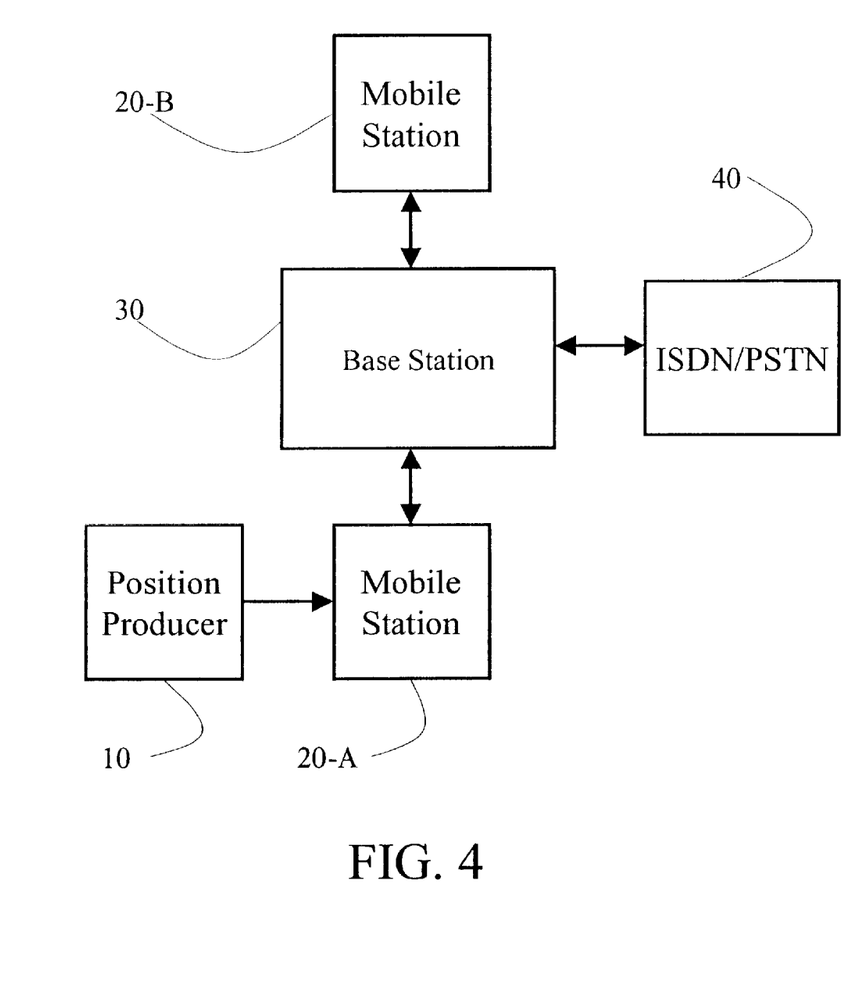
FIG. 4 is a block diagram illustrating the procedure of mobile station position access by another mobile station through the same base station.

FIG. 4 shows a mobile station 20-A which accesses the position data of another mobile station 20-B. A position producer 10 is attached to the mobile station 20-A. This mobile station 20-A is connected to the base station 30 through a wireless communication link through which its position data is transmitted to the base station 30. A mobile station 20-B is also connected to the base station 30 through a wireless communication link. Through this wireless communication link the mobile station 20-B can access the position data of the mobile station 20-A.

Figure 5:
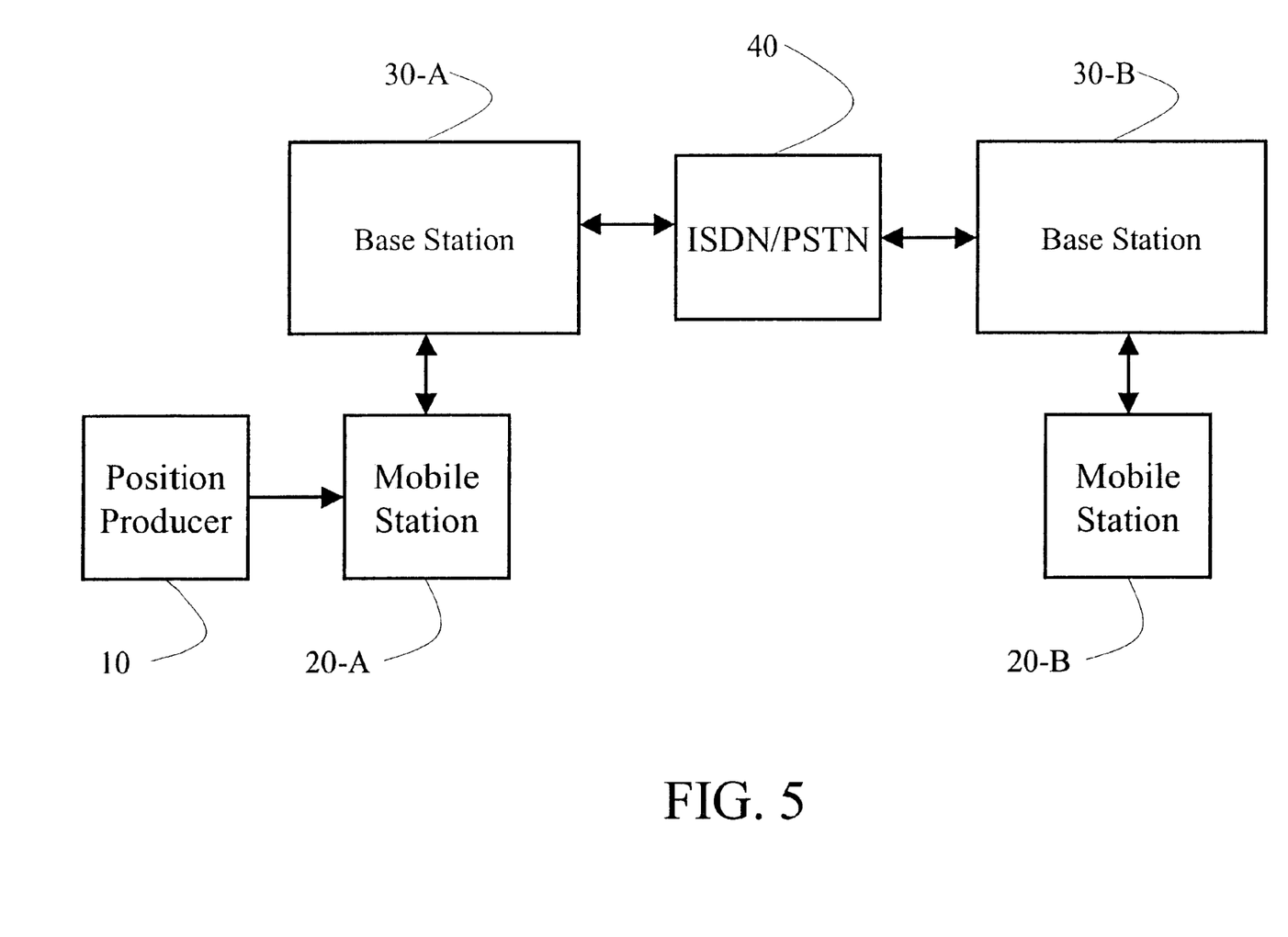
FIG. 5 is a block diagram illustrating the procedure of mobile station position access by another mobile station through ISDN/PSTN.

FIG. 5 illustrates a mobile station 20-A accessing the position data of another mobile station 20-B through ISDN/PSTN 40. The position producer 10 is attached to the mobile station 20-A which is covered by the base station 30-A. That means the mobile station 20-A has a wireless communication link with the base station 30-A. Through this wireless communication link, the position data of the mobile station 20-A is transmitted to the base station 30-A. The mobile station 20-B is connected to the base station 30-B through a wireless communication link. The ISDN/PSTN 40 is connected between the base station 30-A and the base station 30-B. Through the base station 30-B and the ISDN/PSTN 40 the mobile station 20-B can access the position data of the mobile station 20-A at the base station 30-A.

Figure 6:
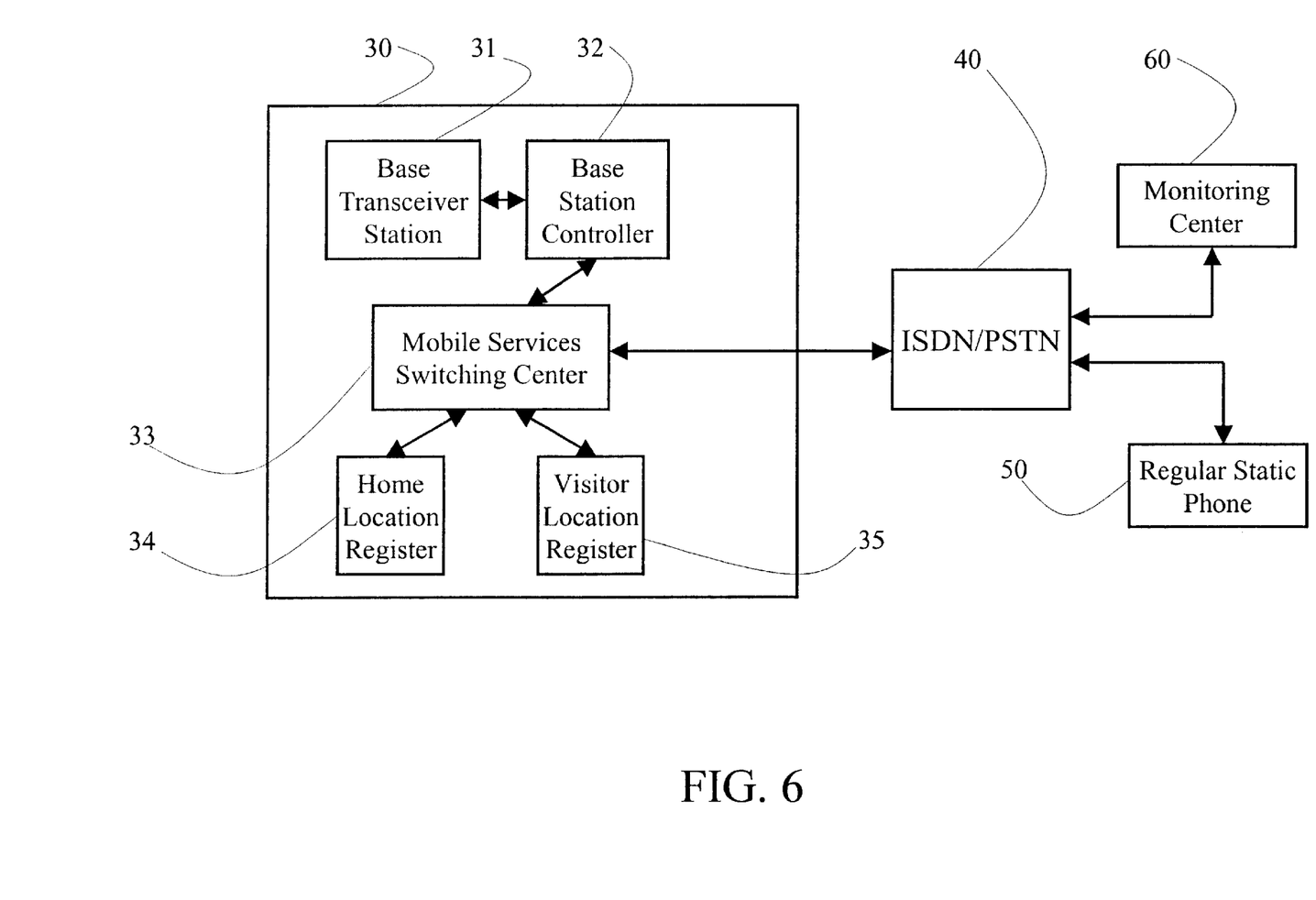
FIG. 6 is a block diagram with a monitoring center, illustrating the procedure of mobile station position access using a regular static phone.

As shown in FIG. 6, the regular static phone user 50 can access the position of a mobile station 20 at a monitoring center 60. The mobile services switching center 33 of the base station 30 is connected to the ISDN/PSTN 40 which is connected to the regular static phone 50. The monitoring center 60 is connected to the ISDN/PSTN 40. Through the ISDN/PSTN 40, the regular static phone 50 can access the position data at the monitoring center 60.

Figure 7:
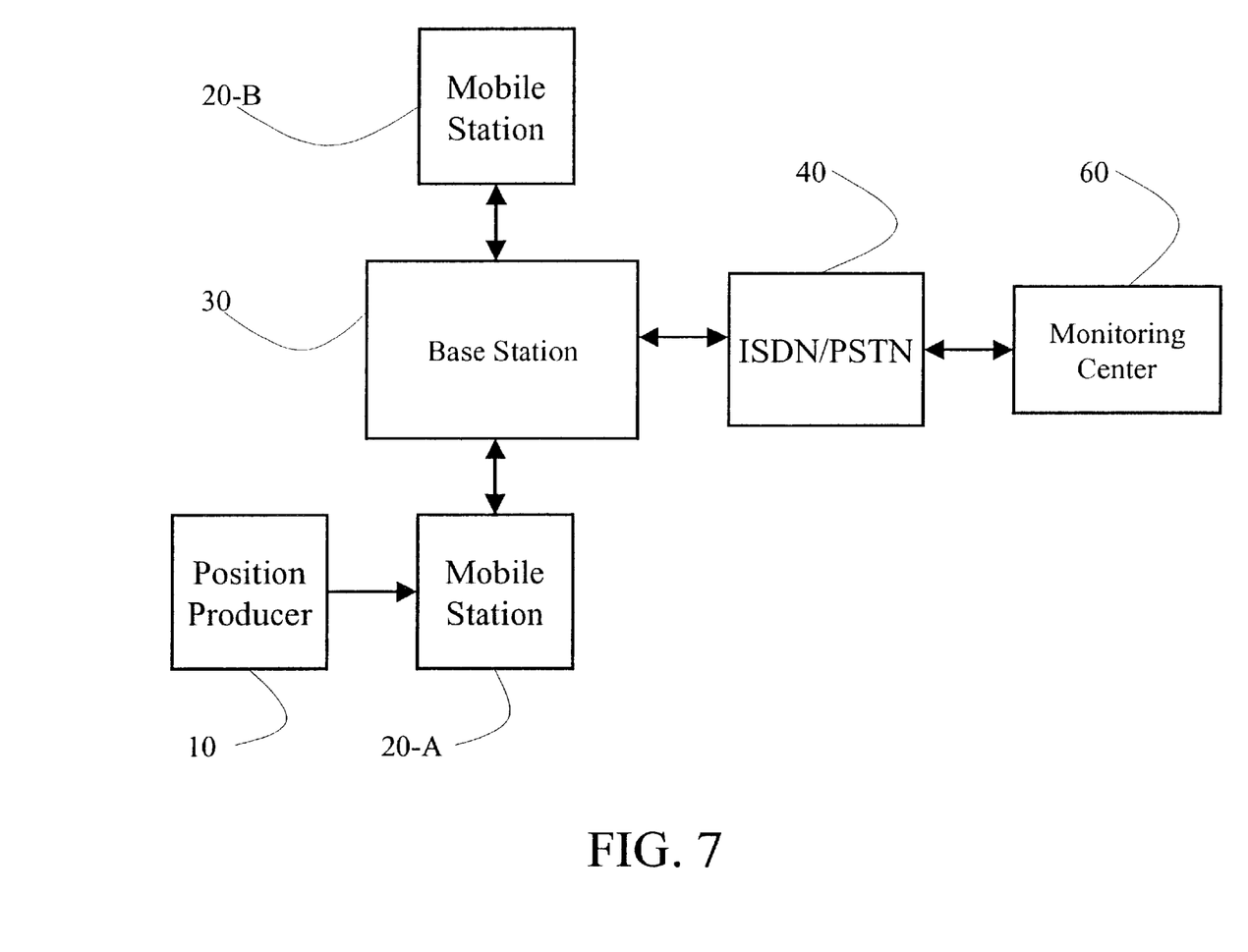
FIG. 7 is a block diagram with a monitoring center, illustrating the procedure of mobile station position access by another mobile station through the same base station.

FIG. 7 illustrates a mobile station 20-A which accesses the position data of another mobile station 20-B at the monitoring center 60. The position producer 10 is attached to the mobile station 20-A. This mobile station 20-A is connected to the base station 30 through a wireless communication link through which its position data is transmitted to the base station 30. The ISDN/PSTN 40 is connected between the base station 30 and the monitoring center 60. Through the ISDN/PSTN 40 the position data of mobile station is sent from base station 30 to the monitoring center 60. A mobile station 20-B is also connected to the base station 30 through a wireless communication link. Through the base station 30 and the ISDN/PSTN 40 the mobile station 20-B can access the position data of the mobile station 20-A at the monitoring center 60.

Figure 8:
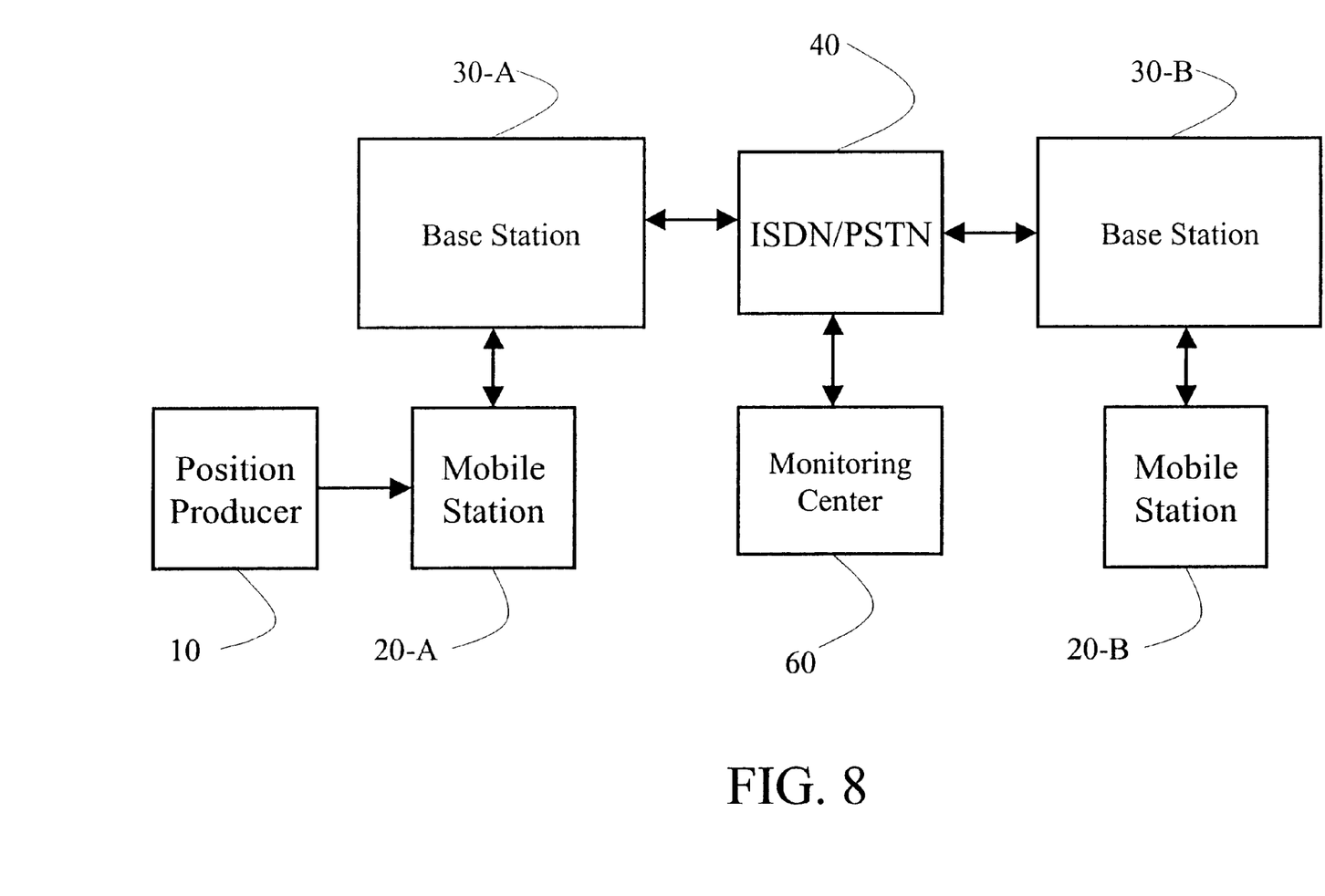
FIG. 8 is a block diagram with a monitoring center, illustrating the procedure of mobile station position access by another mobile station through ISDN/PSTN.

FIG. 8 illustrates a mobile station 20-A accessing the position data of another mobile station 20-B at the monitoring center 60 through ISDN/PSTN 40. The monitoring center 60 is connected to the ISDN/PSTN 40. The position producer 10 is attached to the mobile station 20-A which has a wireless communication link with the base station 30-A. Through this wireless communication link, the position data of the mobile station 20-A is transmitted to the base station 30-A, and then through the ISDN/PSTN 40 sent to the monitoring station 60. The mobile station 20-B is connected to the base station 30-B through a wireless communication link. The ISDN/PSTN 40 is connected between the base station 30-A and the base station 30-B. Through the base station 30-B and the ISDN/PSTN 40 the mobile station 20-B can access the position data of the mobile station 20-A at the monitoring station 60.

In view of above, the present invention can substantially achieve the following improvement in arts:

(1) The cellular phone users can obtain their positions from their cellular phones easily. Moreover, the others may also obtain the exact location of any particular cellular phone user through the cellulose phone system.

(2) One can obtain another cellular phone user's location from the base station of the cellular phone. One can also obtain another cellular phone user's location by making phone call to that cellular phone.

(3) No dialing is required to send out the position data. In fact, the position data of the mobile station (cellular handset) is available and continuously transmitted via a cellular handset when the handset is powered on.

(4) Once the cellular phone of the user is powered on, the cellular phone's position, i.e. the cellular phone user's location, is available by sending position data to the base station along with each location updating procedure of that cellular phone. Moreover, the cellular phone users may willfully choose to provide or block their position data.

(5) This method takes advantages of the existing location updating procedure in a cellular network system to transmit precision position data of a mobile station. It does not need a dialing up to transmit position data. By utilizing this method, the position data of the mobile station can be delivered to the base station or cellular network whenever the mobile station is powered on.

What is claimed is:

1. A method of transmitting position data via cellular communication system, comprising the steps of:
   (a) generating a position data by a position producer;
   (b) sending said position data to a mobile station from said position producer;
   (c) attaching said position data to a location registration data stream by
      (i) encoding said position data during a signal processing to form coded data, wherein a common ciphering scheme is applied to said coded position data;
      (ii) modulating said coded data including said position data during said signal processing, wherein said modulation scheme is a GMSK (Gaussian-filtered Minimum Shift Keying) modulation;
      (iii) converting said coded data which is a registry data stream as well as said position data into analog transmit signals;
      (iv) amplifying said analog transmit signal; and
      (v) broadcasting said analog transmit signal from said mobile station;
   (d) sending said position data along with a location registration data stream to a base station from said mobile station so as to inform which area does said mobile station currently reside in; and
   (e) retrieving said position data by said base station.

2. A method of transmitting position data via cellular communication system, as recited in claim 1, before step (c), further comprising a receiving step of receiving a mobile station country code, a mobile network code, and a location area identity from said base station, wherein a combination of said mobile station country code, said mobile network code, and said location area identity gives a service area in which said mobile station currently resides.

3. A method of transmitting position data via cellular communication system, as recited in claim 2, wherein in step (c), said location registration data stream includes said mobile station identification, said mobile station country code, said mobile network code, and said location area identity.

4. A method of transmitting position data via cellular communication system, as recited in claim 2 or 6, wherein said position data is attached after said mobile country code and before said mobile network code.

5. A method of transmitting position data via cellular communication system, as recited in claim 2 or 6, wherein said position data is attached after said mobile network code and before said location area identification.

6. A method of transmitting position data via cellular communication system, as recited in claim 1, wherein in step (c), said location registration data stream includes said mobile station identification, said mobile station country code, said mobile network code, and said location area identity.

7. A method of transmitting position data via cellular communication system, as recited in any one of claims 1, 6 and 3, wherein in step (d), said position data is sent along with said location registration data by said mobile station to said base station periodically.

8. A method of transmitting position data via cellular communication system, as recited in any one of claims 1, 6 and 3, wherein in step (d), said position data is sent along with said location registration data by said mobile station to said base station whenever said mobile station is powered on.

9. A method of transmitting position data via cellular communication system, as recited in any one of claims 1, 6 and 3, wherein in step (d), said position data is sent along with said location registration data by said mobile station to said base station when said mobile station detects a location area change.

10. A method of transmitting position data via cellular communication system, as recited in any one of claims 1, 6 and 3, wherein in step (e), further comprising a step of storing said position data in a home location register of a cellular network.

11. A method of transmitting position data via cellular communication system, as recited in any one of claims 1, 6 and 3, wherein in step (e), further comprising a step of storing said position data in a visitor location register of a cellular network.

12. A method of transmitting position data via cellular communication system, as recited in claim 1, wherein after step (e), further comprising a step of sending said position data from said base station to a remotely monitoring center via an ISDN/PSTN (Integrated Services Digital Network/Public-Switched Telephone Network).

13. A method of transmitting position data via cellular communication system, as recited in claim 1, wherein said position data is attached to a head of said location registration data.

14. A method of transmitting position data via cellular communication system, as recited in claim 1, wherein said position data is attached after an end of said location registration data.

* * * * *